(12) United States Patent
Nayyar et al.

(10) Patent No.: US 9,075,811 B2
(45) Date of Patent: Jul. 7, 2015

(54) CLOUD INFORMATION MIGRATION SYSTEMS AND METHODS

(75) Inventors: Prachi Nayyar, Maharashtra (IN); Amol Pandurang Tambe, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 274 days.

(21) Appl. No.: 13/250,953

(22) Filed: Sep. 30, 2011

(65) Prior Publication Data

US 2013/0085989 A1    Apr. 4, 2013

(51) Int. Cl.
*G06F 17/30*    (2006.01)

(52) U.S. Cl.
CPC .............................. *G06F 17/30079* (2013.01)

(58) Field of Classification Search
CPC ................................................ G06F 17/30079
USPC ......................................................... 707/610
See application file for complete search history.

(56) References Cited

U.S. PATENT DOCUMENTS

| | | | |
|---|---|---|---|
| 6,735,691 B1 * | 5/2004 | Capps et al. ....................... 713/1 |
| 6,976,103 B1 * | 12/2005 | Watanabe et al. ................ 710/74 |
| 7,483,757 B2 * | 1/2009 | Kishore et al. .................... 700/87 |
| 7,865,707 B2 * | 1/2011 | Bittlingmayer et al. ........... 713/1 |
| 8,255,529 B2 * | 8/2012 | Ferris et al. ..................... 709/224 |
| 8,285,762 B2 * | 10/2012 | Cannon et al. ................. 707/825 |
| 8,429,641 B2 * | 4/2013 | O'Connor et al. ............. 717/168 |
| 8,578,076 B2 * | 11/2013 | van der Linden et al. ...... 710/72 |
| 2006/0026587 A1 * | 2/2006 | Lemarroy et al. ............. 717/170 |
| 2008/0080526 A1 * | 4/2008 | Gounares et al. .............. 370/401 |
| 2010/0061250 A1 * | 3/2010 | Nugent .......................... 370/242 |
| 2010/0199037 A1 * | 8/2010 | Umbehocker et al. ........ 711/113 |
| 2010/0287263 A1 * | 11/2010 | Liu et al. ........................ 709/221 |
| 2010/0332820 A1 * | 12/2010 | Matsushima et al. ......... 713/150 |
| 2010/0333116 A1 * | 12/2010 | Prahlad et al. ................ 719/328 |
| 2011/0138049 A1 * | 6/2011 | Dawson et al. ................ 709/226 |
| 2011/0166952 A1 * | 7/2011 | Manchikanti et al. ....... 705/26.4 |
| 2011/0213719 A1 * | 9/2011 | Ferris et al. .................... 705/310 |
| 2011/0277027 A1 * | 11/2011 | Hayton et al. ..................... 726/8 |
| 2012/0072903 A1 * | 3/2012 | Joukov et al. ................. 717/175 |
| 2012/0221684 A1 * | 8/2012 | Ferris ............................. 709/218 |
| 2012/0221845 A1 * | 8/2012 | Ferris ............................. 713/150 |
| 2012/0265726 A1 * | 10/2012 | Padmanabhan et al. ...... 707/602 |
| 2013/0185331 A1 * | 7/2013 | Conemac ...................... 707/783 |

* cited by examiner

*Primary Examiner* — Miranda Le
(74) *Attorney, Agent, or Firm* — Wilmer Cutler Pickering Hale and Dorr LLP (57) ABSTRACT

Information migration systems and methods are presented. In one embodiment, a cloud information migration method comprises: performing a migration interpretation process, including interpreting migration initiation information; performing a migration information retrieval process to automatically retrieve information in a first configuration from a first cloud vendor in accordance with the migration initiation information; performing a migration information configuration process, including automatically converting the retrieved information in a first configuration to information in a second configuration, wherein the second configuration is compatible with a second cloud vendor; and
  performing a migration information forwarding process to automatically forward the information in a second configuration to the second cloud vendor in accordance with the migration initiation information.

15 Claims, 10 Drawing Sheets

---
310
Receiving a migration initiation indication.

---
320
Performing a HMS credential process.

---
330
Performing a migration initiation information retrieval process.

---
340
Forwarding the migration initiation information to a HMS.

410
Performing a source vendor login process.

420
Performing a migration route determination process.

430
Performing a source download process.

510
Performing a target vendor login process.

520
Performing a migration route determination process.

530
Performing a target upload process.

---
610
Determining possible routes.

---
620
Choosing a particular route.

710
Presenting update status.

---

720
Performing backup storage server updates.

---

730
Updating database entries.

| 810
Migration initiation module. |

| 820
Migration interpretation module. |

| 830
Migration information retrieval module. |

| 840
Migration information configuration module. |

| 850
Migration information forwarding module. |

| 860
Cloud storage management update module. |

CLOUD INFORMATION MIGRATION SYSTEMS AND METHODS

FIELD OF THE INVENTION

The present embodiments relate to the field of information storage and migration.

BACKGROUND OF THE INVENTION

Electronic systems and circuits are often utilized in a number of scenarios to achieve advantageous results. Numerous electronic technologies such as computers, video equipment, and communication systems facilitate increased productivity and cost reduction in analyzing and communicating information in most areas of business, science, education and entertainment. Frequently, these activities involve storage of vast amounts of information and significant resources are expended storing and processing the information. Losing the data can be very detrimental and a number of traditional approaches attempt to utilize data recovery and backup scenarios to facilitate preservation of the data. Cloud computing and storage is emerging as a relatively cheap and trusted medium to store various types of data, however movement of information through clouds can be very complex and complicated.

In attempts to cater to various arising cloud computing and storage scenarios, conventional approaches often include multiple offerings that attempt to backup data to a particular cloud vendor. However, a customer or end user may wish or need to switch storage to a different cloud vendor. The need or desire to switch storage from a first cloud vendor to a second cloud vendor can arise due various technical or tactical considerations. It is appreciated that there can be a variety of scenarios which may motivate or demand cloud vendor migration (e.g., the reasons can include: a cloud vendor going bankrupt, more attractive offerings by another vendor, various legal demands or constraints, etc.). However, traditional approaches do not typically have convenient tools available to assist or ensure that customers can easily migrate their data from one cloud vendor to another cloud vendor. Conventional attempts at switching data storage from a first vendor to a second vendor can be very complex and complicated, and often require a significant amount of manual user interaction.

SUMMARY

Information migration systems and methods are presented. In one embodiment, a cloud information migration method comprises: performing a migration interpretation process, including interpreting migration initiation information; performing a migration information retrieval process to automatically retrieve information in a first configuration from a first cloud vendor in accordance with the migration initiation information; performing a migration information configuration process, including automatically converting the retrieved information in a first configuration to information in a second configuration, wherein the second configuration is compatible with a second cloud vendor; and performing a migration information forwarding process to automatically forward the information in a second configuration to the second cloud vendor in accordance with the migration initiation information.

In one embodiment, the cloud information migration method further comprises performing a cloud storage management update process including automatically updating database entries. The cloud storage management update process can include creating a storage server indication and storage locating indication in a database. The cloud storage management update process can include forwarding migration progress indications to a user. In one exemplary implementation, the cloud information migration method can further comprise a migration route determination process including determining a first route for migrating information from the first cloud vendor and a second route for migrating information to the second cloud vendor. The migration information configuration process can include stripping metadata associated with a first cloud vendor and inserting metadata associated with a second cloud vendor. The cloud information migration method can further comprise a migration initiation process for gathering migration initiation information.

In one embodiment, a reprogrammable tangible computer readable medium having stored thereon, computer executable instructions that when executed by a computer system cause the computer system to perform a method comprising: performing a migration interpretation process, including interpreting migration initiation information; performing a migration information retrieval process to automatically retrieve information in a first configuration from a first cloud vendor in accordance with the migration initiation information; performing a migration information configuration process, including automatically converting the retrieved information in a first configuration to information in a second configuration, wherein the second configuration is compatible with a second cloud vendor; and performing a migration information forwarding process to automatically forward the information in a second configuration to the second cloud vendor in accordance with the migration initiation information.

In one embodiment, the cloud information migration method further comprises performing a cloud storage management update process including automatically updating database entries. The cloud storage management update process can include creating a storage server indication and storage locating indication in a database. The cloud storage management update process can include forwarding migration progress indications to a user. In one exemplary implementation, the cloud information migration method can further comprise a migration route determination process including determining a first route for migrating information from the first cloud vendor and a second route for migrating information to the second cloud vendor. The migration information configuration process can include stripping metadata associated with a first cloud vendor and inserting metadata associated with a second cloud vendor. The cloud information migration method can further comprise a migration initiation process for gathering migration initiation information.

In one embodiment, a computer system comprises: a processor coupled to a computer readable storage media and executing computer readable code which causes the computer system to perform operations including: performing a migration interpretation process, including interpreting migration initiation information; performing a migration information retrieval process to automatically retrieve information in a first configuration from a first cloud vendor in accordance with the migration initiation information; performing a migration information configuration process, including automatically converting the retrieved information in a first configuration to information in a second configuration, wherein the second configuration is compatible with a second cloud vendor; and performing a migration information forwarding process to automatically forward the information in a second configuration to the second cloud vendor in accordance with the migration initiation information.

In one embodiment, the cloud information migration method further comprises performing a cloud storage management update process including automatically updating database entries. The cloud storage management update process can include creating a storage server indication and storage locating indication in a database. The cloud storage management update process can include forwarding migration progress indications to a user. In one exemplary implementation, the cloud information migration method can further comprise a migration route determination process including determining a first route for migrating information from the first cloud vendor and a second route for migrating information to the second cloud vendor. The migration information configuration process can include stripping metadata associated with a first cloud vendor and inserting metadata associated with a second cloud vendor. The cloud information migration method can further comprise a migration initiation process for gathering migration initiation information.

DESCRIPTION OF THE DRAWINGS

The accompanying drawings, which are incorporated in and form a part of this specification, are included for exemplary illustration of the principles of the present embodiments and not intended to limit the present invention to the particular implementations illustrated therein. The drawings are not to scale unless otherwise specifically indicated.

DETAILED DESCRIPTION

Reference will now be made in detail to the preferred embodiments, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope as defined by the appended claims. Furthermore, in the following detailed description, numerous specific details are set forth in order to provide a thorough understanding. However, one ordinarily skilled in the art will understand that the present invention may be practiced without these specific details. In other instances, well known methods, procedures, components, and circuits have not been described in detail as not to unnecessarily obscure aspects of the current invention.

The present systems and methods described below can facilitate efficient and effective cloud migration of information. The migration of information can help overcome problems and complications associated with cloud vendor lock-in problems. In one embodiment, a Hosted Migration Service (HMS) is a service which can be used to migrate information stored with one cloud vendor to another cloud vendor. In one exemplary implementation the information includes backup/archive data. It is appreciated that the present systems and methods can by readily implemented in association with a variety of applications and products.

In one example, an application stores it's data with a first cloud vendor and later wants to migrate this information to a second cloud vendor for storage. In one exemplary implementation, the application is a data protection application (e.g., a backup application, a restore application, etc.). In one embodiment, upon successful migration, the user should be able to retrieve the information from second cloud vendor storage just as the user would have been able to do from the first cloud vendor storage. For convenience, in some of the following description the cloud vendor from which the information is being migrated from is called the source cloud vendor and the cloud vendor to which the information is being migrated to is called the target cloud vendor. While some of the following description includes examples of migrating backed up information, the present systems and methods are applicable to a variety of information stored by a cloud vendor.

Figure 1:
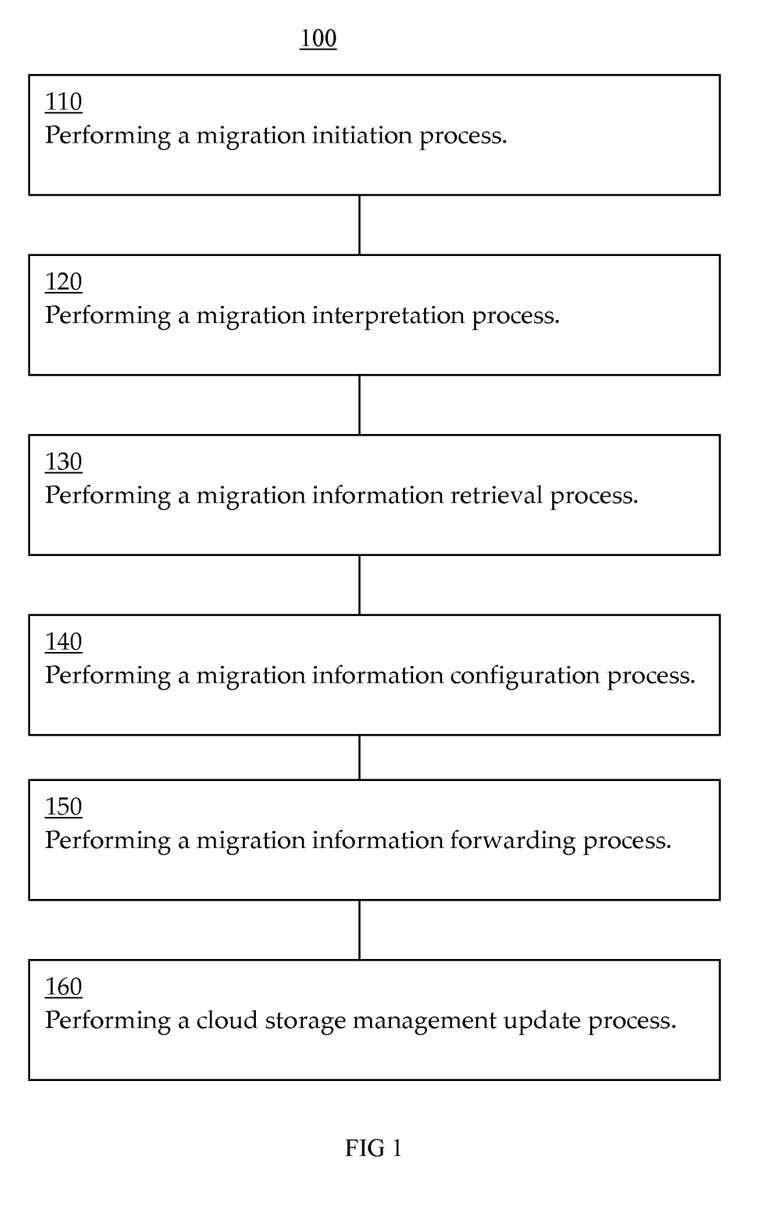
FIG. 1 is a block diagram of an exemplary cloud information migration method in accordance with one embodiment of the present invention.

FIG. 1 is a block diagram of an exemplary cloud information migration method 100 in accordance with one embodiment of the present invention. Cloud information migration method 100 facilitates efficient and convenient information migration.

In block 110, a migration initiation process is performed. In one embodiment, a migration initiation process verifies a user is authorized to initiate information migration. If the user is authorized to initiate information migration, the migration initiation process gathers various additional migration initiation information. The migration initiation information can include information associated with the user (e.g., user names, passwords, etc.) and information associated with the migration (e.g., information associated with the source cloud vendor, information associated with the target cloud vendor, etc.). In one embodiment, a migration request and migration initiation information is sent or forwarded (e.g., from an application, etc.) to a HMS. The migration request and migration initiation information can be encrypted. The migration request and migration initiation information can also be forwarded on a secure communication channel. The secure communication channel can include a dedicated communication channel. Additional description of a migration initiation process is set forth in following sections.

In block 120, a migration interpretation process is performed. In one embodiment, the migration interpretation process includes interpreting received migration initiation information. In one exemplary implementation, the migration initiation information includes information received from block 110. In one embodiment, a HMS receives the encrypted schema and decrypts it. Additional description of a migration interpretation process is set forth in following sections.

In block 130, a migration information retrieval process is performed. In one embodiment, the migration information retrieval process automatically retrieves information in a first configuration from a first cloud vendor. The information can be retrieved in accordance with migration initiation information received from block 110. Additional description of a migration information retrieval process is set forth in following sections.

In block 140, a migration information configuration process is performed. In one embodiment, a migration information configuration process includes automatically converting the retrieved information in a first configuration to information in a second configuration. In one exemplary implementation, the first configuration is associated or compatible with a first cloud vendor and the second configuration is associated or compatible with a second cloud vendor. The migration information configuration process can parse information received in block 130 to identify fundamental information associated with a user storage request from configuration information associated with a cloud vendor. The conversion can include removing metadata (e.g., tags, sequence numbers, other file information, etc.) associated with a first cloud vendor and inserting metadata associated with a second cloud vendor. Additional description of a migration information configuration process is set forth in following sections.

In block 150, a migration information forwarding process is performed. In one embodiment, a migration information forwarding process includes automatically forwarding the information in a second configuration to the second cloud vendor. The information can be forwarded in accordance with migration initiation information received from block 110. Additional description of a migration information forwarding process is set forth in following sections.

In block 160, a cloud storage management update process is performed. In one embodiment, the cloud storage management update process includes automatically updating database entries or catalog entries (e.g., new location, time of file, etc.). Additional description of a cloud storage management update process is set forth in following sections. In one embodiment, the cloud storage management update process includes creating a storage server indication and storage locating indication in a database. In one exemplary implementation, the database is a backup master database.

Figure 2:
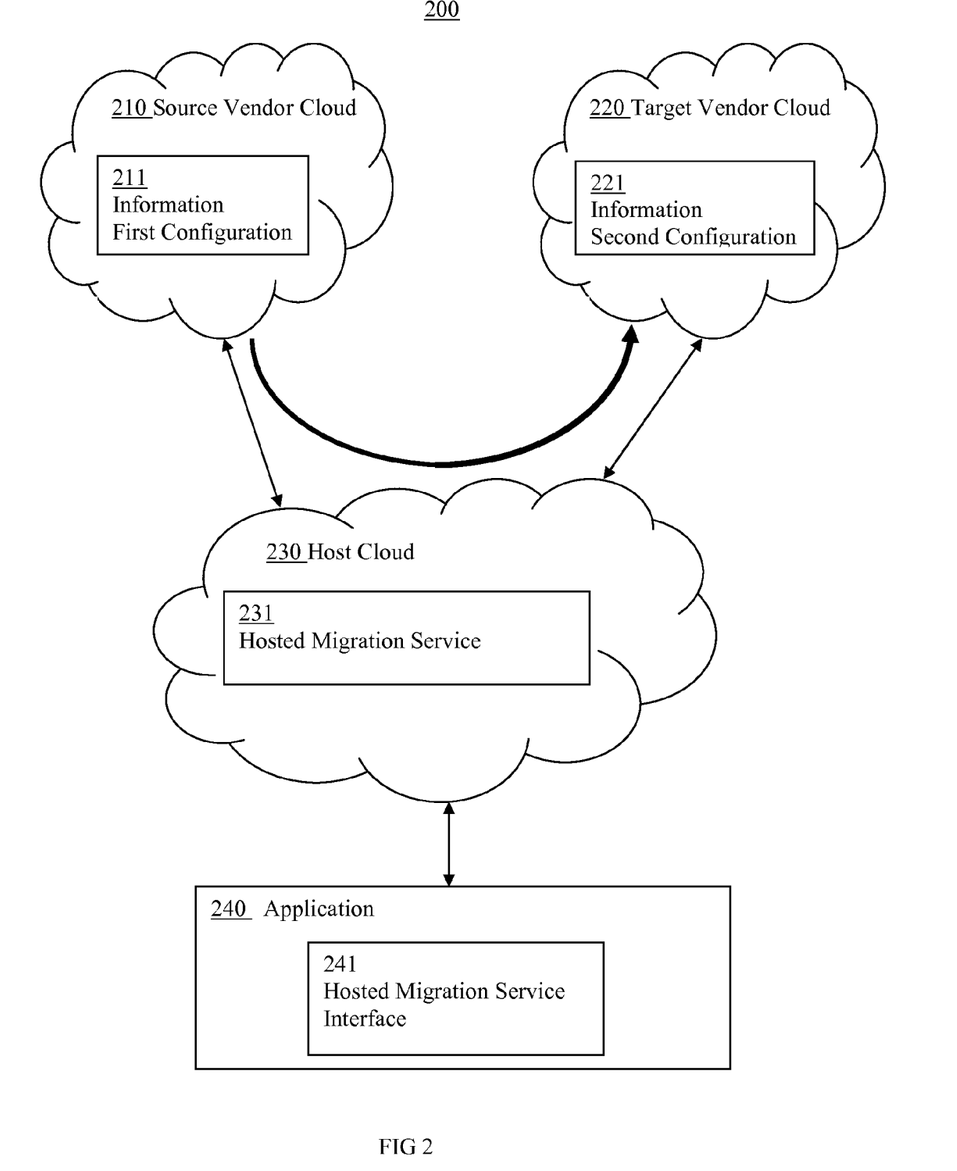
FIG. 2 is a block diagram of an exemplary information migration system in accordance with one embodiment of the present invention.

FIG. 2 is a block diagram of information migration system 200 in accordance with one embodiment of the present invention. Information migration system 200 includes source vendor cloud 210, target vendor cloud 220, host cloud 230 which includes hosted migration service (HMS) 231 and application 240 which includes hosted migration service interface 241. Source vendor cloud 210 and target vendor cloud 220 are communicatively coupled to host cloud 230 which is communicatively coupled to application 240.

The components of information migration system 200 cooperatively operate to automatically migrate information from one cloud vendor to another cloud vendor. Source cloud vendor 210 includes information in a first configuration. The first configuration can be configured in a format compatible with the source cloud vendor and can include metadata associated with the first cloud vendor. In one exemplary implementation, information migration is initiated by the application 240 via hosted migration service interface 241. In one embodiment, hosted migration service interface 241 directs operations associated a migration initiation process. The information migration can be initiated in a variety of ways (e.g., by a user, automatically, etc.). In one embodiment, migration initiation information (e.g., user information, source cloud vendor information, target cloud vendor information, etc.) is gathered and forwarded to the hosted migration service 231 via hosted migration service interface 241. Hosted migration service 231 interprets or analyzes the migration initiation information. In one embodiment, hosted migration service 231 directs operations of a migration interpretation process.

Hosted migration service 231 automatically directs migration of information in accordance with the migration initiation information. Hosted migration service 231 directs automatic retrieval of the information in the first configuration 211 from source vendor cloud 210. In one embodiment, hosted migration service 231 performs a migration information retrieval process. Hosted migration service 231 automatically converts the retrieved information in a first configuration to similar information but in a second configuration. In one embodiment, the hosted migration service performs a migration information configuration process. The conversion can include removing metadata associated with the first cloud vendor and inserting metadata associated with the second cloud vendor. Hosted migration service 231 directs automatic forwarding of the information in the second configuration 221 to target vendor cloud 220. In one embodiment, hosted migration service 231 performs a migration information forwarding process. Hosted migration service interface 241 can forward migration status information including percent complete. Hosted migration service interface 241 can update information regarding the migration (e.g., database entries or catalog entries including new location, time of file, etc.). In one embodiment, hosted migration service interface 241 performs a cloud storage management update process.

In one embodiment, application 240 can be a data protection or backup application and information being migrated is backup/restore information. In one exemplary implementation, the backup application is a Symantec backup application (e.g., Symantec NetBackup™, Symantec Backup Exec™, etc.). The present systems and methods can also be readily adapted for implementations supporting or compatible with Symantec Open Storage program. In one embodiment, instructions and information associated with a cloud information migration method can be stored on a file system. It is appreciated that the information migration can be implemented between a variety of different cloud vendors (e.g., Amazon S3, Rackspace, Nirvanix, ATT, etc.). It is also appreciated that the hosted migration service (HMS) can be hosted by a variety of systems (e.g., hosted in a cloud, hosted on a dedicated system, hosted at a backup application vendor resource, etc.).

Figure 3:
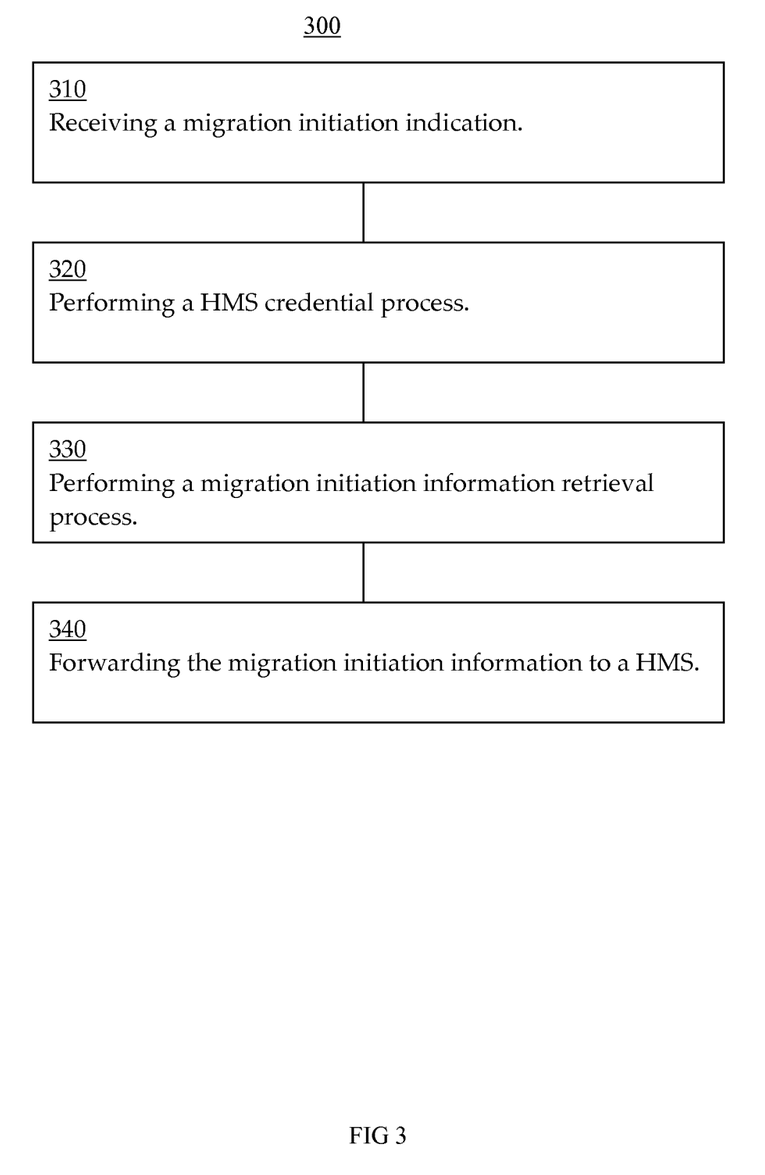
FIG. 3 is a block diagram of exemplary migration initiation process in accordance with one embodiment of the present invention.

FIG. 3 is a block diagram of exemplary migration initiation process 300 in accordance with one embodiment of the present invention. In one embodiment, migration initiation process 300 is similar to the migration initiation process performed in block 110.

In block 310, a migration initiation indication is received. In one embodiment, the migration initiation indication includes an indication a user logged into an application User Interface and selected a new option for cloud vendor migration. It is appreciated the user interface can include a variety of implementations (e.g., a GUI, a command line interface, etc.).

In block 320, a HMS credential process is performed. In one embodiment, a user is "asked" to provide HMS credentials. In one exemplary implementation, a verification process is performed to verify the user is authorized to access the HMS. If the credentials indicate the user is not authorized to access the HMS the HMS does not perform information migration for the user. If the credentials indicate the user is valid and authorized to access the HMS, a secure connection with the HMS is established using the verified credentials and the process proceeds to block 330.

In block 330, a migration initiation information retrieval process is performed. In one embodiment, the migration initiation information retrieval process can include retrieving information associated with a source cloud vendor and a target cloud vendor. The information from the source cloud vendor can include type of source storage server, name of source storage server, Logical Storage Unit (LSU) or directory name of source storage server and credentials for source storage server. The information from the target cloud vendor can include type of target storage server, name of target storage server, LSU or directory name of target storage server and credentials for target storage server. In one exemplary implementation, the user is asked or prompted to enter the respective information for the source vendor and target vendor. In one embodiment, the respective information for the source vendor and target vendor can be automatically retrieved.

In block 340, the application forwards the migration initiation information to a HMS. In one embodiment, the application bundles the migration initiation information for both the source vendor and target vendor in a format of a simple XML schema and sends it to the HMS using standard security mechanism such as PKI. Application's and HMS's public/private keys are used to secure the communication.

Figure 4:
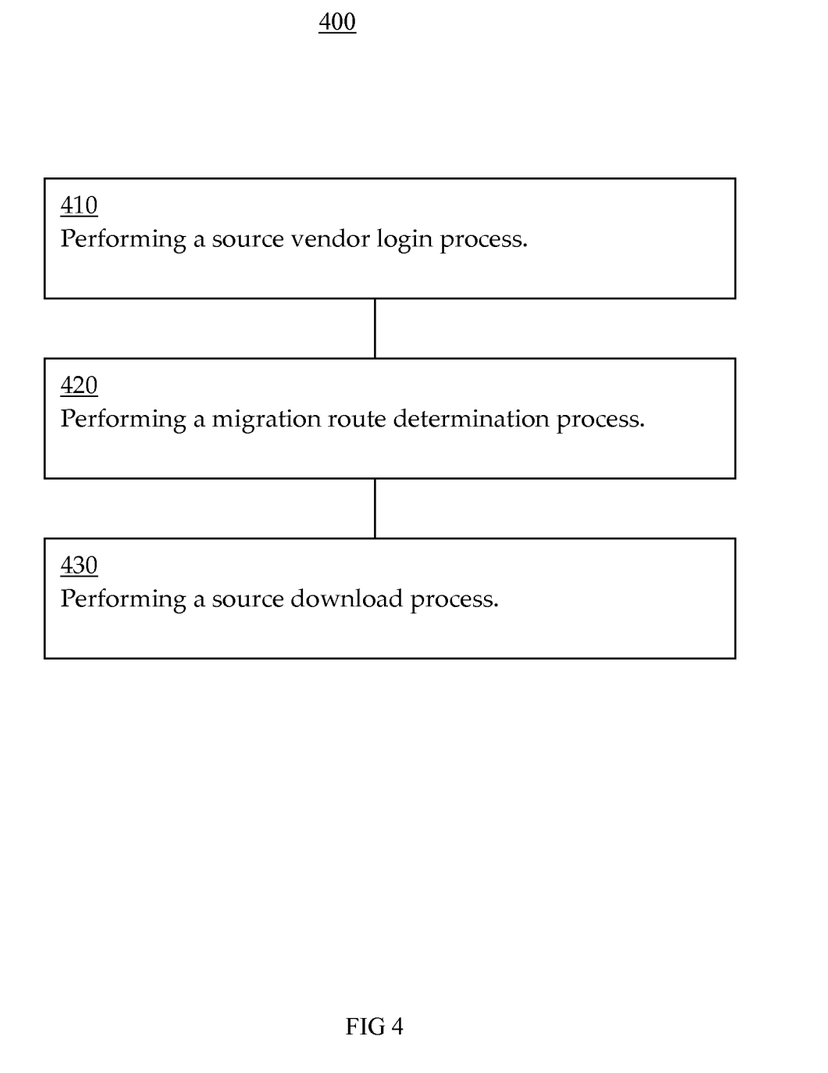
FIG. 4 is a block diagram of an exemplary migration information retrieval process in accordance with one embodiment of the present invention.

FIG. 4 is a block diagram of an exemplary migration information retrieval process 400 in accordance with one embodiment of the present invention. In one embodiment, migration information retrieval process 400 is similar to the migration information retrieval process performed in block 130. In one exemplary implementation, migration information retrieval process 400 automatically retrieves information in a first configuration from a first cloud vendor in accordance with received migration initiation information.

In block 410, a source vendor login process is performed. In one embodiment, a HMS logs into a source vendor. The source vendor login process can use the source vendor associated credentials included in the migration initiation information.

In block 420, a migration route determination process is performed. In one embodiment, a migration route determination process includes determining a route for migrating information from the source cloud vendor. It is appreciated that a variety of routing mechanisms can be utilized (e.g., over a network, physical shipment of transfer drive with info stored on it, communication via a dedicated line, etc.). It is also appreciated that a variety of factors can be considered or factored into a routing decision (e.g., time to complete the transfer, consumptions of resources, cost, etc.). Additional description of a migration route determination process is set forth in following sections.

In block 430, a source download process is performed. In one embodiment, information is downloaded from a source cloud vendor. In one exemplary implementation, the information can be downloaded from the source vendor using the source vendor's APIs. In one exemplary implementation, the information is downloaded via a route determined in block 420. While doing the download, the portions of the migration initiation information (e.g., user supplied LSU names, etc.) can be used to make sure that the desired data is migrated. In one exemplary implementation, all the data from one LSU is migrated.

Figure 5:
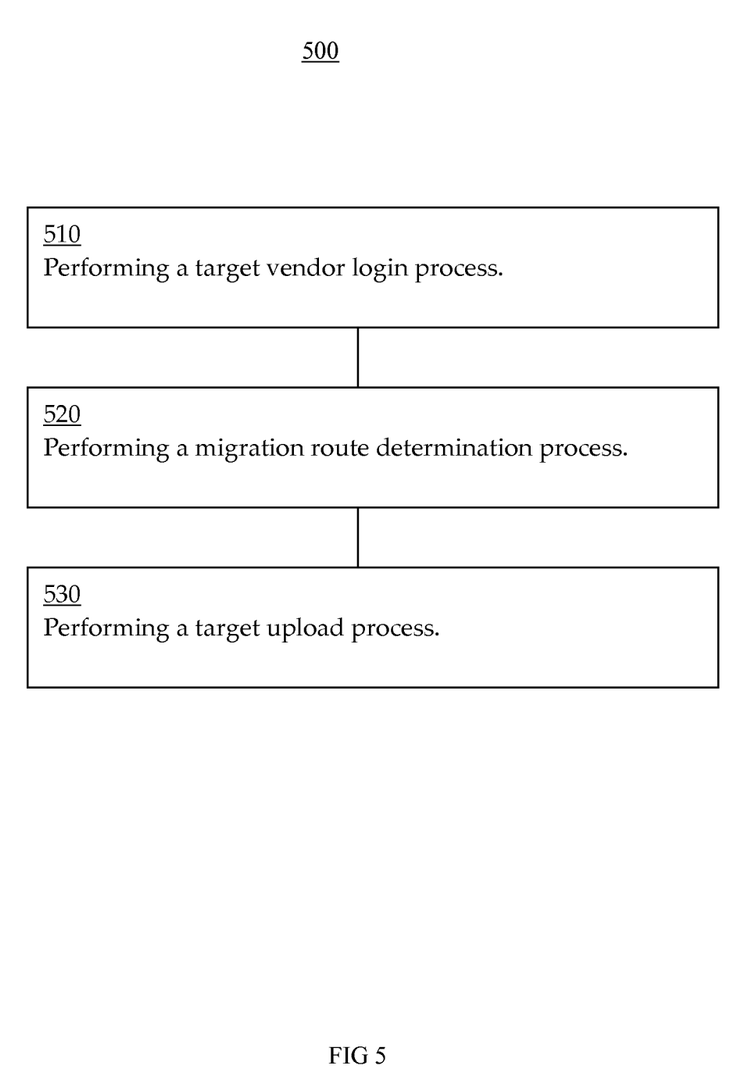
FIG. 5 is a block diagram of an exemplary migration information forwarding process in accordance with one embodiment of the present invention.

FIG. 5 is a block diagram of an exemplary migration information forwarding process 500 in accordance with one embodiment of the present invention. In one embodiment, migration information forwarding process 500 is similar to the migration information forwarding process performed in block 150. In one exemplary implementation, migration information forwarding process 500 automatically forwards information in a second configuration to a second cloud vendor in accordance with received migration initiation information.

In block 510, a target vendor login process is performed. In one embodiment, a HMS logs into a target vendor. The target vendor login process can use the target vendor associated credentials.

In block 520, a migration route determination process is performed. In one embodiment, a migration route determination process includes determining a route for migrating information to the target cloud vendor. Again, it is appreciated that a variety of routing mechanisms can be utilized (e.g., over a network, physical shipment of transfer drive with info stored on it, communication via a dedicated line, etc.). It is also appreciated that a variety of factors can be considered or factored into a routing decision (e.g., time to complete the transfer, consumptions of resources, cost, etc.).

In block 530, a target upload process is performed. In one embodiment, information is uploaded to a target cloud vendor. In one exemplary implementation, the information can be uploaded to the target vendor using the target vendor's APIs. In one exemplary implementation, the information is uploaded via a route determined in block 520. While doing the upload, portions of the migration initiation information (e.g., user supplied LSU names, etc.) can be used to make sure that the desired data is migrated. In one exemplary implementation, all the data from one LSU is migrated.

Figure 6:
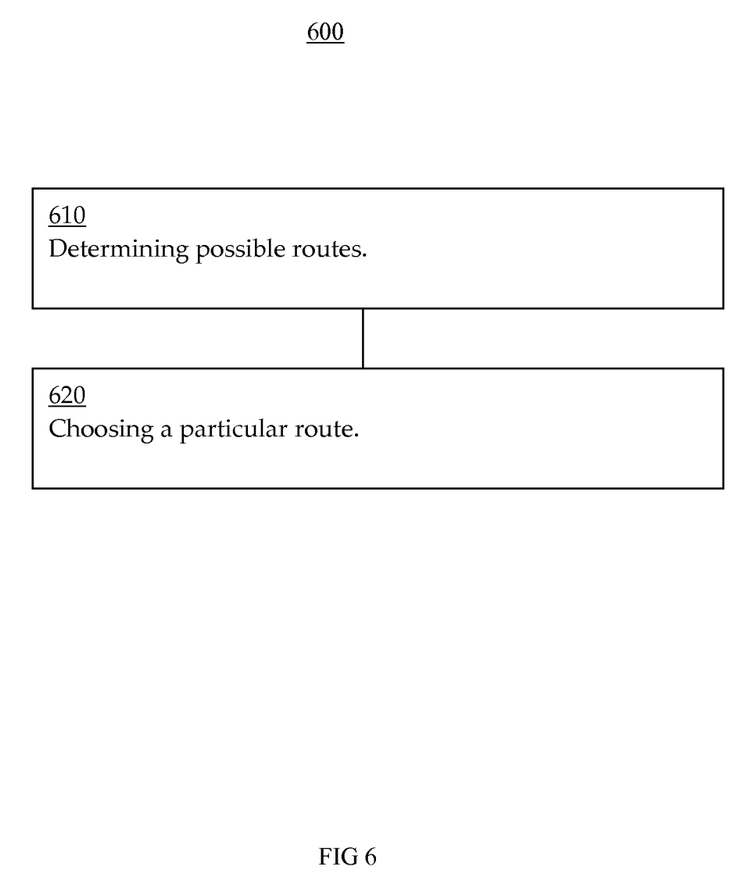
FIG. 6 is a block diagram of an exemplary migration route determination process in accordance with one embodiment of the present invention.

FIG. 6 is a block diagram of an exemplary migration route determination process 600 in accordance with one embodiment of the present invention. In one embodiment, migration route determination process approach can facilitate the ability to do the data transfer in an efficient way using inbuilt intelligence.

In block 610, possible routes are determined. In one embodiment, the HMS can store information on transfer paths between various vendors. The information can include a mapping of amount of data to be transferred, time of transfer using a mechanism, cost of transfer using that mechanism. Information from this mapping can be used while migrating information from one cloud vendor to another vendor. In one exemplary implementation, the information can be used to perform data migration in the most time or cost efficient way.

In block 620, a particular route is chosen. Choosing the particular route can include various considerations or factors. In one embodiment, the considerations or factors can include time to complete the migration, the availability of network resources, the cost of using the routes, etc. It is appreciated that multiple considerations or factors can be "weighed" or considered. In one exemplary implementation, the speed at which the information is transferred versus the cost is weighed or considered. For example, if it is important to perform the migration rapidly a relatively expensive mechanism or route that is faster can be chosen over a relatively inexpensive mechanism or if it is not important to perform the migration rapidly a relatively inexpensive mechanism or route that is slower can be chosen over a relatively expensive mechanism. It is also appreciated that factors or considerations can change. If a network is availability for other operations is important at a particular time, the information pull or push to or from a cloud vendor can be delayed for a more convenient time or an alternate mechanism (e.g., physical drive shipment, etc.) can be used.

In one exemplary implementation, a first cloud vendor supports transfer of information by a physical drive and that physical drive mechanism is more efficient or convenient (e.g., faster, does not occupy network or computer resources that could be left available for other purposes, etc.) than communicating the information via another mechanism and a second cloud vendor supports transfer of information by a network and that network mechanism is more efficient or convenient communicating the information via another mechanism. The HMS can get data from the first cloud vendor via physical shipment of the transfer drives and then transfer the data from HMS to the second cloud vendor over the network. Maximum data transfer efficiency can be obtained by deploying various techniques. WAN acceleration can be used to boost the data transfer rates. Transfer drives can be used if supported. The scheme can be expanded further to leverage dedicated lines between vendors and HMS if such lines are set up.

Figure 7:
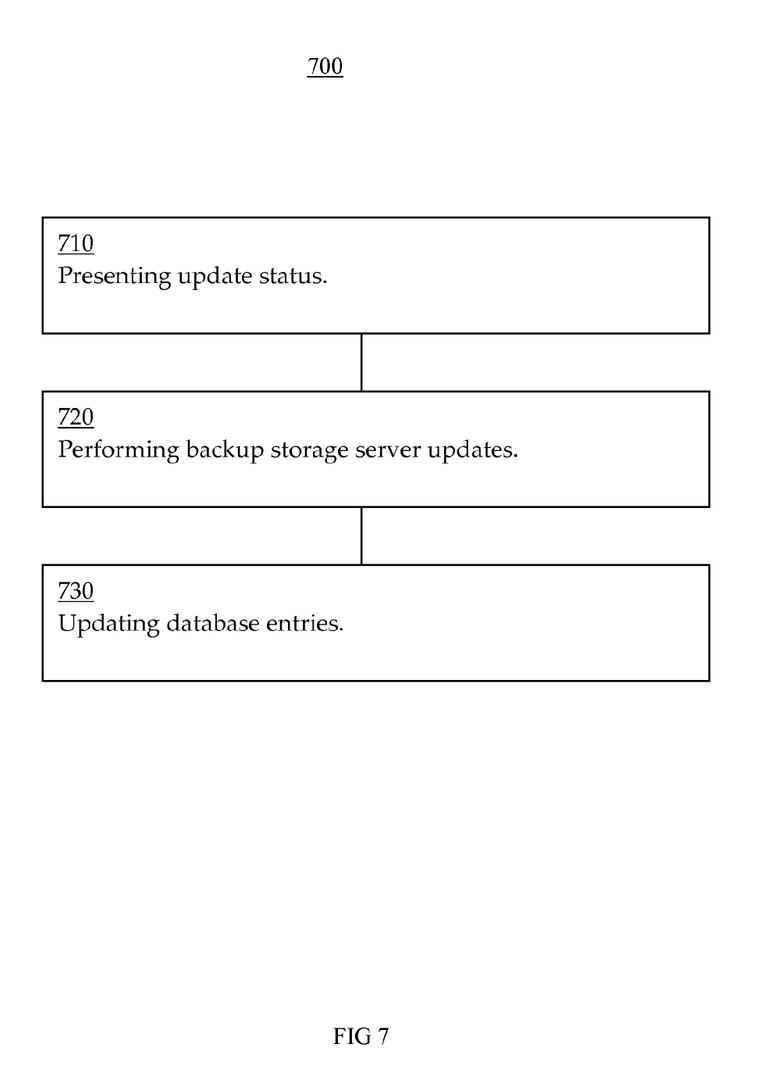
FIG. 7 is a block diagram of an exemplary cloud storage management update process in accordance with one embodiment of the present invention.

FIG. 7 is a block diagram of exemplary cloud storage management update process 700 in accordance with one embodiment. In one embodiment, cloud storage management update process 700 is similar to the cloud storage management update process performed in block 160.

In block 710, update status is presented. In one embodiment, periodic status or progress updates are sent by the HMS to an application server that initiated the data migration. Once the migration is successfully complete, a notification of completion is sent to the application. If the migration is not successfully completed, a notification (e.g., error code, etc.) that the migration was not successfully complete can be sent to the application. In one exemplary implementation, the notifications are sent to an application master server. In one embodiment, the migration job status is indicated in an application activity monitor. In one embodiment, the migration the status is presented in an application Activity Monitor.

In block 720, storage server updates are performed. In one embodiment, an application server creates Storage Server and LSU's in the application database. Names of these Storage Servers and LSUs can be same as what was entered initially.

In block 730, database entries are updated. In one embodiment, catalog entries are updated. In one embodiment, the application executes commands to update the application database entries to point to new cloud vendor. In one exemplary implementation, an application master server executes the commands. These entries can include Storage Server Type, Storage Server Name, LSU name and similar details (Disk pool, STU etc)

Upon successful migration completion, in one exemplary implementation the user can retrieve or restore the data from the new cloud vendor (e.g., second cloud vendor, target cloud vendor, etc.). In one embodiment, all or a portion of the data or information from source vendor can be deleted after the migration. It is also appreciated that all or a portion of the data or information can be retained on the source vendor after the migration.

It is appreciated that there are a variety of ways in which data can be migrated. In one embodiment, data is pulled from a first cloud vendor and conveyed to the HMS using a preferred (e.g., optimized, fastest, most convenient, etc.) route. Data is pushed from the HMS to second cloud vendor using a preferred route and mechanism. It is appreciated that the preferred route or mechanism utilized to pull and push are not necessarily the same.

In one embodiment, a seamless, single command or single click option is utilized for initiating data migration between two cloud vendors through a modified existing application via user interfaces (UI). In one example, the user can initiate data migration by selecting a "Data Migration" menu option in the GUI. In one exemplary implementation, the user also enters a few details such as source identification, target identification, LSU indications, and the login credentials for those. This option can communicate with HMS and initiate a data transfer. The UI can also be used to convey the progress information. For example, periodic progress updates can be sent to application for presentation of progress information in the GUI.

It is appreciated that migration systems and methods can be conveniently implemented on various cloud storage applications and architectures. In one embodiment, the data migration can be achieved with minimal additional infrastructure. The HMS can also facilitate savings in various infrastructure costs. Network cost savings can be realized as the data being transferred is not brought on the actual customer network. Hence the cost of downloading and then uploading this data is saved. This also saves the customer network from significant congestion due to heavy volumes of data transfer storage cost savings can be realized when the data transfer does not happen through the customer's network, as they do not need to provision extra storage to store the data before it is uploaded to the second vendor. Furthermore, software/solutions cost savings can be realized as the customer's network need not deploy special software such as WAN accelerators to increase efficiency.

Figure 8:
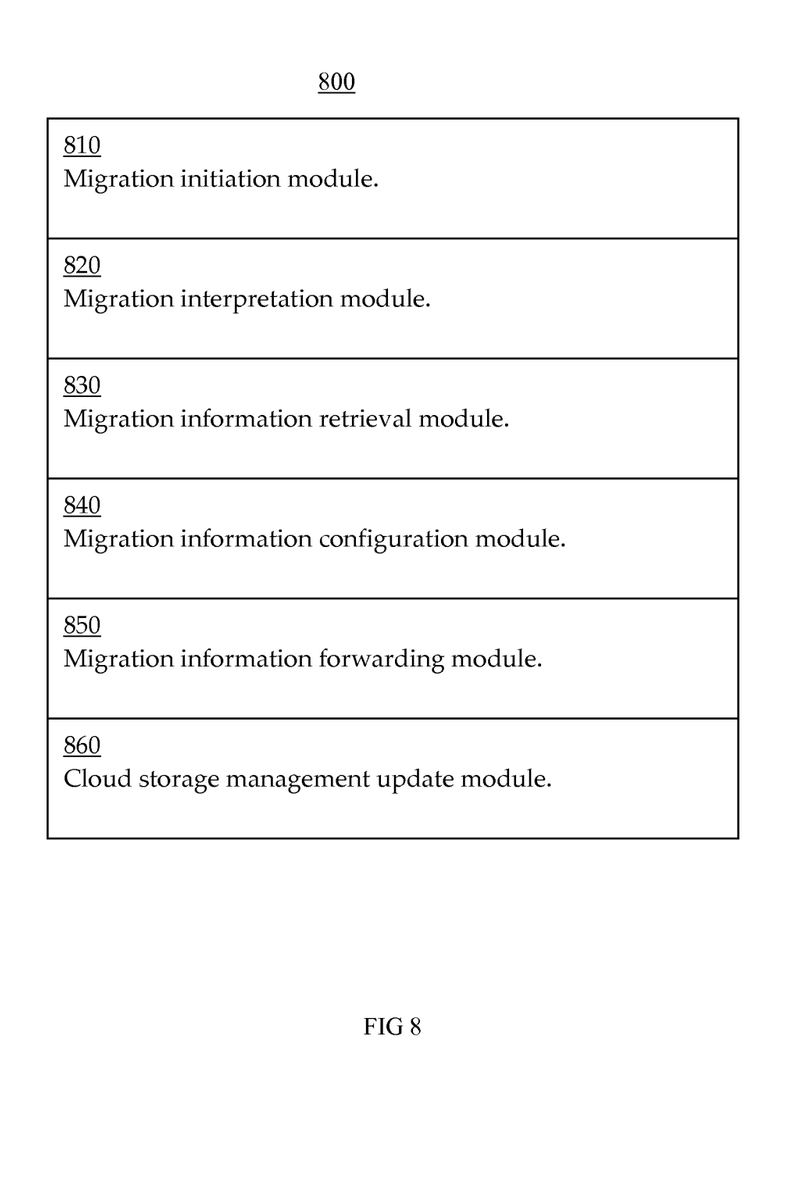
FIG. 8 is a block diagram of an exemplary cloud information migration module in accordance with one embodiment of the present invention.

FIG. 8 is a block diagram of exemplary cloud information migration module 800 which includes instructions for directing a processor in the performance of a migration method in accordance with one embodiment of the present invention. In one embodiment, exemplary cloud information migration module 800 includes instructions for directing a processor in the performance of a migration method 100. Cloud information migration method module 800 includes migration initiation module 810, a migration interpretation module 820 and migration information retrieval module 830, migration information configuration module 840, migration information forwarding module 850 and cloud storage management update module 860.

Migration initiation module 810 includes instructions for performing migration initiation. In one embodiment, migration initiation module 810 includes instructions for performing migration initiation as indicated in block 110. Migration interpretation module 820 includes instructions for performing migration interpretation. In one embodiment, migration interpretation module 820 includes instructions for performing migration interpretation as indicated in block 120. Migration information retrieval module 830 includes instructions for performing migration information retrieval. In one embodiment, migration information retrieval module 830 includes instructions for performing migration information retrieval as indicated in block 130. Migration information configuration module 840 includes instructions for performing migration information configuration. In one embodiment, migration information configuration module 840 includes instructions for performing migration information configuration as indicated in block 140. Migration information forwarding module 850 includes instructions for performing migration information forwarding. In one embodiment, migration information forwarding module 850 includes instructions for performing migration information forwarding as indicated in block 150. Cloud storage management update module 860 includes instructions for performing cloud storage management update. In one embodiment, cloud storage management update module 860 includes instructions for performing cloud storage management update as indicated in block 160.

Figure 9:
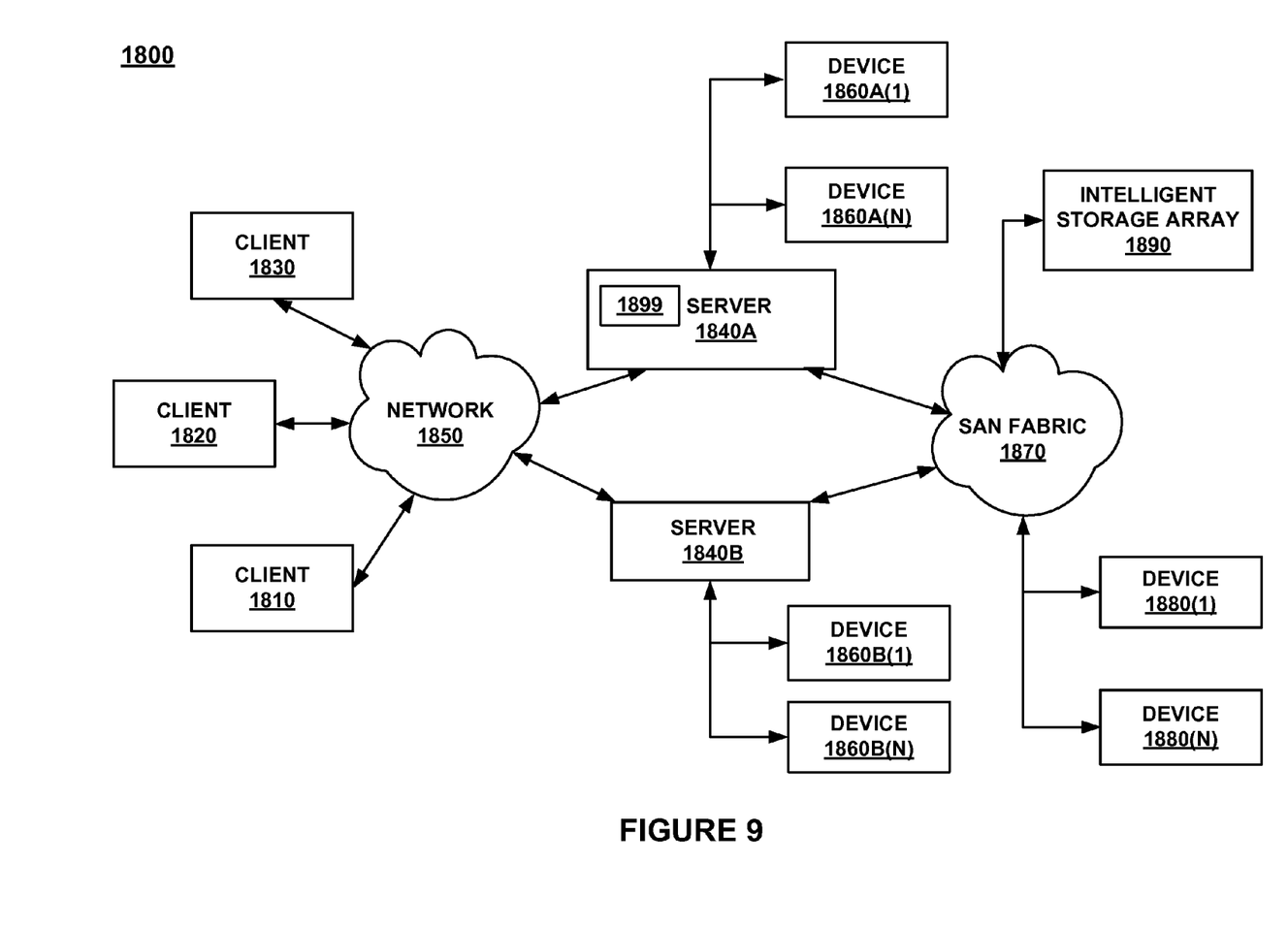
FIG. 9 is a block diagram depicting an exemplary network architecture in accordance with one embodiment of the present invention.

It is appreciated present migration systems and methods can be implemented as part of a variety of environments. For example, migration systems and methods can be implemented as part of a distributed computing environment, a cloud computing environment, a virtual environment, a client server environment, etc. In one embodiment, an information migration method (e.g., cloud information migration method 100, etc.) can be implemented on a network. FIG. 9 is a block diagram depicting an exemplary network architecture 1800 in which client systems 1810, 1820 and 1830, as well as storage servers 1840A and 1840B (any of which can be implemented using computer system 1110), are coupled to a network 1850. Storage server 1840A is further depicted as having storage devices 1860A (1)-(N) directly attached, and storage server 1840B is depicted with storage devices 1860B (1)-(N) directly attached. Storage servers 1840A and 1840B are also connected to a SAN fabric 1870, although connection to a storage area network is not required for operation of the disclosure. SAN fabric 1870 supports access to storage devices 1880(1)-(N) by storage servers 1840A and 1840B, and also by client systems 1810, 1820 and 1830 via network 1850. Intelligent storage array 1890 is also shown as an example of a specific storage device accessible via SAN fabric 1870. In one embodiment, server 1840A includes cloud information migration module 1899. In one embodiment, cloud information migration module 1899 is similar to variable cloud information migration module 800. It is appreciated that present systems and methods are compatible with a variety of implementations. For example, portions of information and instructions associated with can be distributed in various resources.

Figure 10:
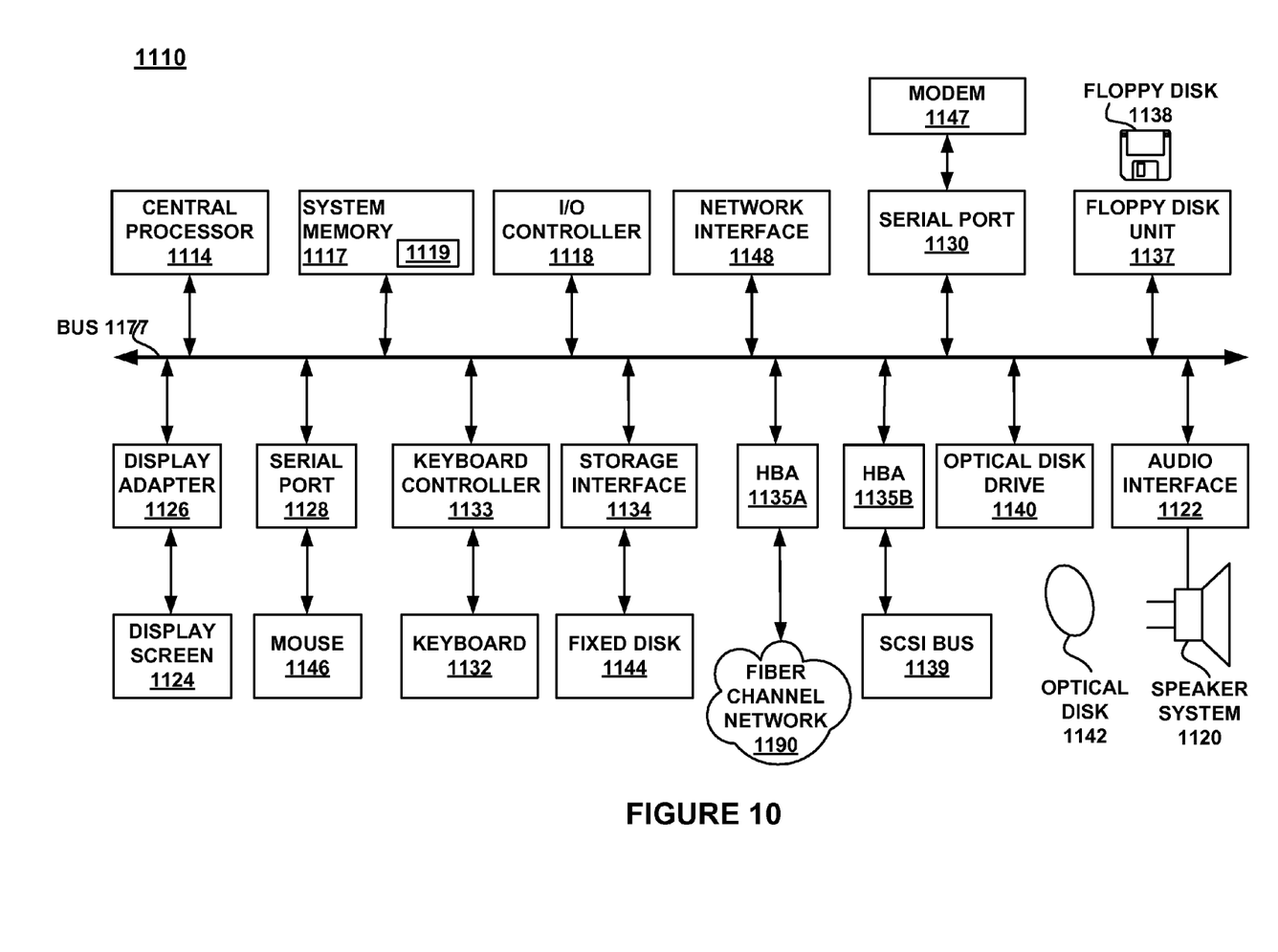
FIG. 10 depicts a block diagram of an exemplary computer system suitable for implementing the present methods.

FIG. 10 depicts a block diagram of an exemplary computer system 1110 suitable for implementing the present methods. Computer system 1110 includes a bus 1177 which interconnects major subsystems of computer system 1110, such as a central processor 1114, a system memory 1117 (typically RAM, but which may also include ROM, flash RAM, or the like), an input/output controller 1118, an external audio device, such as a speaker system 1120 via an audio output interface 1122, an external device, such as a display screen 1124 via display adapter 1126, serial ports 1128 and 1130, a keyboard 1132 (interfaced with a keyboard controller 1133), a storage interface 1134, a floppy disk drive 1137 operative to receive a floppy disk 1138, a host bus adapter (HBA) interface card 1135A operative to connect with a Fiber Channel network 1190, a host bus adapter (HBA) interface card 1135B operative to connect to a SCSI bus 1139, and an optical disk drive 1140 operative to receive an optical disk 1142. Also included are a mouse 1146 or other point-and-click device (coupled to bus 1177 via serial port 1128), a modem 1147 (coupled to bus 1177 via serial port 1130), and a network interface 1148 (coupled directly to bus 1177).

Bus 1177 allows data communication between central processor 1114 and system memory 1117, which may include read-only memory (ROM) or flash memory (neither shown), and random access memory (RAM) (not shown), as previously noted. In one embodiment, instructions for performing an information migration method (e.g., similar to method 100, etc.) are stored in one or more memories of computer system 1100 (e.g., in memory location 1119). The RAM is generally the main memory into which the operating system and application programs are loaded. In one embodiment, RAM 1117 includes a cloud information migration module (e.g., in memory location 1119). In one embodiment, a cloud information migration module stored in memory location 1119 is similar to cloud information migration module 800. The ROM or flash memory can contain, among other code, the Basic Input-Output system (BIOS) which controls basic hardware operation such as the interaction with peripheral components. Applications resident with computer system 1110 are generally stored on and accessed via a computer readable medium, such as a hard disk drive (e.g., fixed disk 1144), an optical drive (e.g., optical drive 1140), floppy disk unit 1137, or other storage medium. Additionally, applications can be in the form of electronic signals modulated in accordance with the application and data communication technology when accessed via network modem 1147 or interface 1148.

Storage interface 1134, as with the other storage interfaces of computer system 1110, can connect to a standard computer readable medium for storage and/or retrieval of information, such as a fixed disk drive 1144. Fixed disk drive 1144 may be a part of computer system 1110 or may be separate and accessed through other interface systems. Modem 1147 may provide a direct connection to a remote server via a telephone link or to the Internet via an internet service provider (ISP). Network interface 1148 may provide a direct connection to a remote server via a direct network link to the Internet via a POP (point of presence). Network interface 1148 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 9 need not be present to practice the present disclosure. The devices and subsystems can be interconnected in different ways from that shown in FIG. 9. Code to implement the present disclosure can be stored in computer-readable storage media such as one or more of system memory 1117, fixed disk 1144, optical disk 1142, or floppy disk 1138. The operating system provided on computer system 1110 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

With reference to computer system 1110, modem 1147, network interface 1148 or some other method can be used to provide connectivity from each of client computer systems 1810, 1820 and 1830 to network 1850. Client systems 1810, 1820 and 1830 are able to access information on network addressable storage using, for example, a transfer coordination component, a web browser, or other client software (not shown). Such a client allows client systems 1810, 1820 and 1830 to access data hosted by storage server 1840 or 1880 or one of the corresponding storage devices. FIG. 9 depicts the use of a network such as the Internet for exchanging data, but the present disclosure is not limited to the Internet or any particular network-based environment.

Thus, the present systems and methods facilitate efficient and effective migration. Unlike conventional attempts, systems and methods similar to those included in the present detailed description can facilitate consistent and convenient automated migration of information.

Portions of the detailed description are presented and discussed in terms of a method. Although steps and sequencing thereof are disclosed in figures herein describing the operations of this method, such steps and sequencing are exemplary. Embodiments are well suited to performing various other steps or variations of the steps recited in the flowchart of the figure herein, and in a sequence other than that depicted and described herein. Some portions of the detailed description are presented in terms of procedures, steps, logic blocks, processing, and other symbolic representations of operations on data bits that can be performed within a computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "processing", "computing", "calculating", "determining", "displaying", "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices can include at least some form of computer readable media. Computer readable media can be any available media that can be accessed by a computing device. The computer readable medium can include reprogrammable non-transient tangible computer readable media. By way of example, and not limitation, computer readable medium may comprise computer storage media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies carrier waves or other transport mechanism and includes any information delivery media. By way of example, and not limitation, communication media includes wired media such as a wired network or direct-wired connection, and wireless media such as acoustic, RF, infrared, other wireless media, and combinations of any of the above.

Some embodiments may be described in the general context of computer-executable instructions, such as program modules, executed by one or more computers or other devices. Generally, program modules include routines, programs, objects, components, data structures, etc, that perform particular tasks or implement particular abstract data types. The functionality of the program modules may be combined or distributed as desired in various embodiments.

The foregoing descriptions of specific embodiments have been presented for purposes of illustration and description. They are not intended to be exhaustive or to limit the invention to the precise forms disclosed, and many modifications and variations are possible in light of the above teaching. The embodiments were chosen and described in order to best explain the principles and its practical application, to thereby enable others skilled in the art to best utilize the invention and various embodiments with various modifications as are suited to the particular use contemplated. It is intended that the scope be defined by the Claims appended hereto and their equivalents.

What is claimed is:

1. A cloud information migration method comprising:
performing, utilizing at least one computer processor, a migration interpretation process including retrieving first migration initiation information from a first cloud data storage provider and second migration initiation information from a second cloud data storage provider, and interpreting the first and second migration initiation information, wherein the first migration initiation information includes at least one of a type of the first cloud data storage provider and a name of the first cloud data storage provider and the second migration initiation information includes a type of the second cloud data storage provider and a name of the second cloud data storage provider;
performing a migration information retrieval process to automatically retrieve information in a first configuration from the first cloud data storage provider in accordance with the first migration initiation information, the first cloud data storage provider utilizing a first physical network architecture, wherein the information in the first configuration includes data and separate metadata, and wherein the first and second migration initiation information are different from the data and separate metadata;
performing a migration information configuration process, including automatically converting the retrieved information including the data and separate metadata in the first configuration to information in a second configuration, wherein the second configuration is compatible with the second cloud data storage provider, the second cloud data storage provider utilizing a second physical network architecture distinct from the first physical network architecture, and wherein the migration information configuration process further includes removing the metadata associated with the first cloud data storage provider and inserting second metadata associated with the second cloud data storage provider;

determining a first route for migrating the information from the first cloud data storage provider and a second route for migrating the information to the second cloud data storage provider;
selecting one of the first route and the second route as a migration route to forward the information to the second cloud data storage provider based on characteristics of the first route and the second route; and
performing a migration information forwarding process to automatically forward the information in the second configuration to the second cloud data storage provider via the migration route in accordance with the second migration initiation information.

2. The cloud information migration method of claim 1, further comprising:
performing a cloud storage management update process including automatically updating database entries.

3. The cloud information migration method of claim 1, wherein the cloud storage management update process includes creating a storage server indication and storage locating indication in a database.

4. The cloud information migration method of claim 1, wherein the cloud storage management update process includes forwarding migration progress indications to a user.

5. The cloud information migration method of claim 1, further comprising:
retrieving the first configuration from the first cloud data storage provider and the second configuration from the second cloud data storage provider.

6. A reprogrammable non-transitory computer readable medium having stored thereon, computer executable instructions that when executed by a computer system cause the computer system to perform a method comprising:
retrieving first migration initiation information from a first cloud data storage provider and second migration initiation information from a second cloud data storage provider, and performing a migration interpretation process, including interpreting the first and second migration initiation information, wherein the first migration initiation information includes at least one of a type of the first cloud data storage provider and a name of the first cloud data storage provider and the second migration initiation information includes a type of the second cloud data storage provider and a name of the second cloud data storage provider;
performing a migration information retrieval process to automatically retrieve information in a first configuration from the first cloud data storage provider in accordance with the first migration initiation information, the first cloud data storage provider utilizing a first physical network architecture, wherein the information in the first configuration includes data and separate metadata, and wherein the first and second migration initiation information are different from the data and separate metadata;
performing a migration information configuration process, including automatically converting the retrieved information including the data and separate metadata in the first configuration to information in the second configuration, wherein the second configuration is compatible with a second cloud data storage provider, the second cloud data storage provider utilizing a second physical network architecture distinct from the first physical network architecture, and wherein the migration information configuration process further includes removing the metadata associated with the first cloud data storage provider and inserting second metadata associated with the second cloud data storage provider;
determining a first route for migrating information from the first cloud data storage provider and a second route for migrating information to the second cloud data storage provider;
selecting one of the first route and the second route as a migration route to forward the information to the second cloud data storage provider based on characteristics of the first route and the second route; and
performing a migration information forwarding process to automatically forward the information in the second configuration to the second cloud data storage provider via the migration route in accordance with the second migration initiation information.

7. The reprogrammable non-transitory computer readable medium of claim 6, further comprising:
performing a cloud storage management update process including automatically updating database entries.

8. The reprogrammable non-transitory computer readable medium of claim 6, wherein the cloud storage management update process includes creating a storage server indication and storage locating indication in a database.

9. The reprogrammable non-transitory computer readable medium of claim 6, wherein the cloud storage management update process includes forwarding migration progress indications to a user.

10. The reprogrammable non-transitory computer readable medium of claim 6, further comprising:
retrieving the first configuration from the first cloud data storage provider and the second configuration from the second cloud data storage provider.

11. A computer system comprising:
a processor coupled to a computer readable storage media and executing computer readable code which causes the computer system to perform operations including:
performing a migration interpretation process, including retrieving first migration initiation information from a first cloud data storage provider and second migration initiation information from a second cloud data storage provider, and interpreting the first and second migration initiation information, wherein the first migration initiation information includes at least one of a type of the first cloud data storage provider and a name of the first cloud data storage provider and the second migration initiation information includes a type of the second cloud data storage provider and a name of the second cloud data storage provider;
performing a migration information retrieval process to automatically retrieve information in a first configuration from the first cloud data storage provider in accordance with the first migration initiation information, the first cloud data storage provider utilizing a first physical network architecture, wherein the information in the first configuration includes data and separate metadata, and wherein the first and second migration initiation information are different from the data and separate metadata;
performing a migration information configuration process, including automatically converting the retrieved information including the data and separate metadata in the first configuration to information in a second configuration, wherein the second configuration is compatible with the second cloud data storage provider, the second cloud data storage provider utilizing a second physical network architecture distinct from the first physical network architecture, and wherein the migration information configuration process further includes removing the metadata associated with the first cloud data storage provider and inserting second metadata associated with the second cloud data storage provider;

determining a first route for migrating information from the first cloud data storage provider and a second route for migrating information to the second cloud data storage provider;

selecting one of the first route and the second route as a migration route to forward the information to the second cloud data storage provider based on characteristics of the first route and the second route; and performing a migration information forwarding process to automatically forward the information in the second configuration to the second cloud data storage provider via the migration route in accordance with the second migration initiation information.

12. The computer system of claim 11, the operations further comprising:
performing a cloud storage management update process including automatically updating database entries.

13. The computer system of claim 11, wherein the cloud storage management update process includes creating a storage server indication and storage locating indication in a database.

14. The computer system of claim 11, wherein the cloud storage management update process includes forwarding migration progress indications to a user.

15. The computer system of claim 11, the operations further comprising:
retrieving the first configuration from the first cloud data storage provider and the second configuration from the second cloud data storage provider.

* * * * *